United States Patent

Oprea

[19]

[11] Patent Number: 5,870,394
[45] Date of Patent: Feb. 9, 1999

[54] METHOD AND APPARATUS FOR REASSEMBLY OF DATA PACKETS INTO MESSAGES IN AN ASYNCHRONOUS TRANSFER MODE COMMUNICATIONS SYSTEM

[75] Inventor: Dan Oprea, Ontario, Canada

[73] Assignee: Northern Telecom Limited, Quebec, Canada

[21] Appl. No.: 681,461

[22] Filed: Jul. 23, 1996

[51] Int. Cl.[6] .................................................... H04L 12/56
[52] U.S. Cl. .......................... 370/392; 370/399; 370/474
[58] Field of Search ..................................... 370/395, 399, 370/409, 412, 413, 415, 417, 465, 466, 467, 471, 473, 474, 392; 395/200.43, 200.66, 200.75, 610, 621, 622

[56] References Cited

PUBLICATIONS

Author: International Telecom Union. Title: Integrated Services Digital Network (ISDN) Overall Network Aspects and Functions B–ISDN ATM Adaptive Layer (ALL) Type 5 Specification. pp. 1–27 and appendices. May 1996. Place of Pub.: Geneva, CH.

Author: Integrated Device Technology, Inc. Title: 155 Mb/s ATM Segmentation & Reassembly "SAR" Controller for the PCI Local Bus IDT77201 data sheet. pp. 1–11. Apr. 1994. Place of Pub.: United States.

Author: Transwitch Corp. Title: ATM Technology & Applications Seminar. Jan. 1995. Place of Pub.: United States.

*Primary Examiner*—Chi H. Pham
*Assistant Examiner*—Kwang B. Yao

[57] ABSTRACT

An apparatus for receiving messages defined by data packets having respective header and payload portions where each header portion includes a channel representation regarding a channel associated with the data packet and an end of message representation representing whether or not the data packet is a final data packet in the message and where each payload portion includes information pertaining to the message. The apparatus includes data memory for storing the payload portions of the data packets, list memory, a header processor for receiving the header portion of the data packet and for providing status signals indicative of the channel representation and the end of message representation, and a reassembly processor programmed to maintain in the list memory a pointer list of address pointers to unused blocks of data memory and a link list of address pointers associated with each channel.

16 Claims, 4 Drawing Sheets

METHOD AND APPARATUS FOR REASSEMBLY OF DATA PACKETS INTO MESSAGES IN AN ASYNCHRONOUS TRANSFER MODE COMMUNICATIONS SYSTEM

BACKGROUND OF THE INVENTION

This invention relates to reassembly of data packets into messages, in an Asynchronous Transfer Mode communications system.

Asynchronous transfer mode (ATM) network interfaces are becoming popular, especially in networks which support data transfer rates in excess of 1.544 Mbits per second in North America and 2.0 Mbits per second in Europe. It is well known that the asynchronous mode of transmitting and switching information in a network provides the advantages of mixing data, voice and video on the same medium.

In an ATM transmission, a transmitting network node represents a message as a plurality of data packets. Different messages may have different lengths and, therefore, different numbers of data packets. For example, a carriage return message would have a smaller length than a message representing a frame of video.

Each data packet includes 53 octets or bytes, 48 of which represent data and the remaining 5 of which represent control information including a message identification and an end of message status. These 53 octets are transmitted over an ATM network by a Physical Layer Interface (PHY) which receives signals from a host computer via an interface known as a Universal Test and Operations Physical Layer Interface for ATM (UTOPIA) and which creates the physical signals used on the network to effect data and handshaking functions. The physical signals may include optical signals for transmission over a fibre optic cable.

At a receiving node on the ATM network, a similar physical layer interface receives physical signals from the above and other transmitters and produces system-level physical signals in the UTOPIA format. Such signals include data signals which represent the 53-octet ATM data packets originally transmitted from each transmitter. However, it is possible, and in a busy network probable, that a 53-octet ATM data packet from another transmitter may be received before a next data packet from the original transmitter is received. Thus, the receiver receives a succession of data packets where each data packet may be from a different transmitter. The receiver then has the task of re-assembling into a contiguous sequence, all data packets of each respective message.

One method of data packet reassembly is disclosed in a data sheet for a 155 Mb/s ATM Segmentation & Reassembly "SAR" Controller for the PCI local Bus, published October 1995 by Integrated Device Technology, Inc. of Santa Clara, Calif., USA. This method involves the use of a relatively small free buffer, of a fixed length, typically less than 128 octets, to receive at least initial cells of a given data packet. If the message includes a large number of data packets, the small free buffer can become full in which case, relatively large free buffers, of a fixed length, typically 4K octets, are appended to the small free buffer to accommodate the remainder of the packets in the message. However, memory is wasted in this approach because, for example, since each data packet includes 53 octets, 3 data packets will require the use of one small buffer and one large buffer which will cause approximately 3K of the large 4 buffer to be left unused. This can be wasteful of memory, particularly where the receiving node is expected to received a large number of data packets on a large number of channels. The present invention addresses these problems.

SUMMARY OF THE INVENTION

In accordance with one aspect of the invention, there is provided a method for receiving messages defined by data packets having respective header and payload portions where each header portion includes a channel representation regarding a channel associated with the data packet and an end of message representation representing whether or not the data packet is a final data packet in the message and where each payload portion includes information pertaining to the message. The method includes the steps of i) maintaining a pointer list of address pointers to unused blocks of data memory operable to store the payload portions of the data packets; ii) maintaining a link list of address pointers associated with each channel; iii) loading the payload portion of a received data packet into a block of data memory identified by a pointer from the pointer list; iv) removing the pointer from the pointer list; and v) adding the pointer to the link list associated with the channel representation indicated by the header portion of the data packet.

Optionally, a reassembly processor may be used to perform the above steps.

Preferably, the method includes the step of receiving at a header processor the header portion of the data packet and causing the header processor to provide to the reassembly processor status signals indicative of the channel representation and the end of message representation.

Preferably, the method includes the step of maintaining the pointer list to identify blocks of unused data memory of equal length where the blocks include 48 octets each.

The method further includes the step of copying the payload portions of each of the received data packets associated with the same message into a receive area of data memory.

The method further includes the step of removing from the link list the pointer associated with each block of data memory used to store a respective payload portion.

Preferably, the method includes the step of adding the pointer to the pointer list, in response to the end of message representation.

Preferably, the method includes the step of copying the payload portions to the receive area in the order in which they were received such that the receive area contains a replica of at least a contiguous portion of the message.

Preferably, the method includes the step of copying each address pointer to the pointer list after its respective payload portion is copied to the receive area.

In accordance with another aspect of the invention, there is provided an apparatus for receiving messages defined by data packets having respective header and payload portions where each header portion includes a channel representation regarding a channel associated with the data packet and an end of message representation representing whether or not the data packet is a final data packet in a message and where each payload portion includes information pertaining to the message. The apparatus includes data memory for storing the payload portions of the data packets, list memory, a header processor for receiving the header portion of the data packet and for providing status signals indicative of the channel representation and the end of message representation, and a reassembly processor programmed to maintain in the list memory a pointer list of address pointers to unused blocks of data memory and a link list of pointer addresses associated with each channel.

Preferably, the reassembly processor is further programmed to load the payload portion of a received data packet into a block of data memory identified by a pointer from the pointer list, to remove the pointer from the pointer list, and to add the pointer to the link list associated with the channel representation indicated by the status signals from the header processor.

Preferably, the blocks are of equal length and include 8 octets each.

Preferably, the data memory has a receive area and the reassembly processor is further programmed to copy the payload portions of each of the received data packets associated with the same message into the receive area of data memory, remove from the link list the pointer associated with each block of data memory used to store a respective payload portion and add the pointer to the pointer list, in response to the end of message signal.

Preferably, the reassembly processor is further programmed to copy the payload portions to the receive area in the order in which they were received such that the receive area contains a replica of at least a contiguous portion of the message.

Preferably, the reassembly processor is further programmed to copy each address pointer to the pointer list after its respective payload portion is copied to the receive area.

Pre-allocated portions of memory for receiving each message are not required as in conventional reassembly methods and apparatus. Rather, according to the present invention, data memory allocated to receiving incoming data packets can have a variable length to provide just enough memory locations to accommodate just the data packets received. The extra overhead in processing and in memory used to define and maintain the pointer list and link lists is negligible, particularly where the node is required to handle a large number of messages from a large number of virtual channels as would be the case where the node is connected to a telephone network.

BRIEF DESCRIPTION OF THE DRAWINGS

In drawings which illustrate embodiments of the invention.

DETAILED DESCRIPTION

Figure 1:
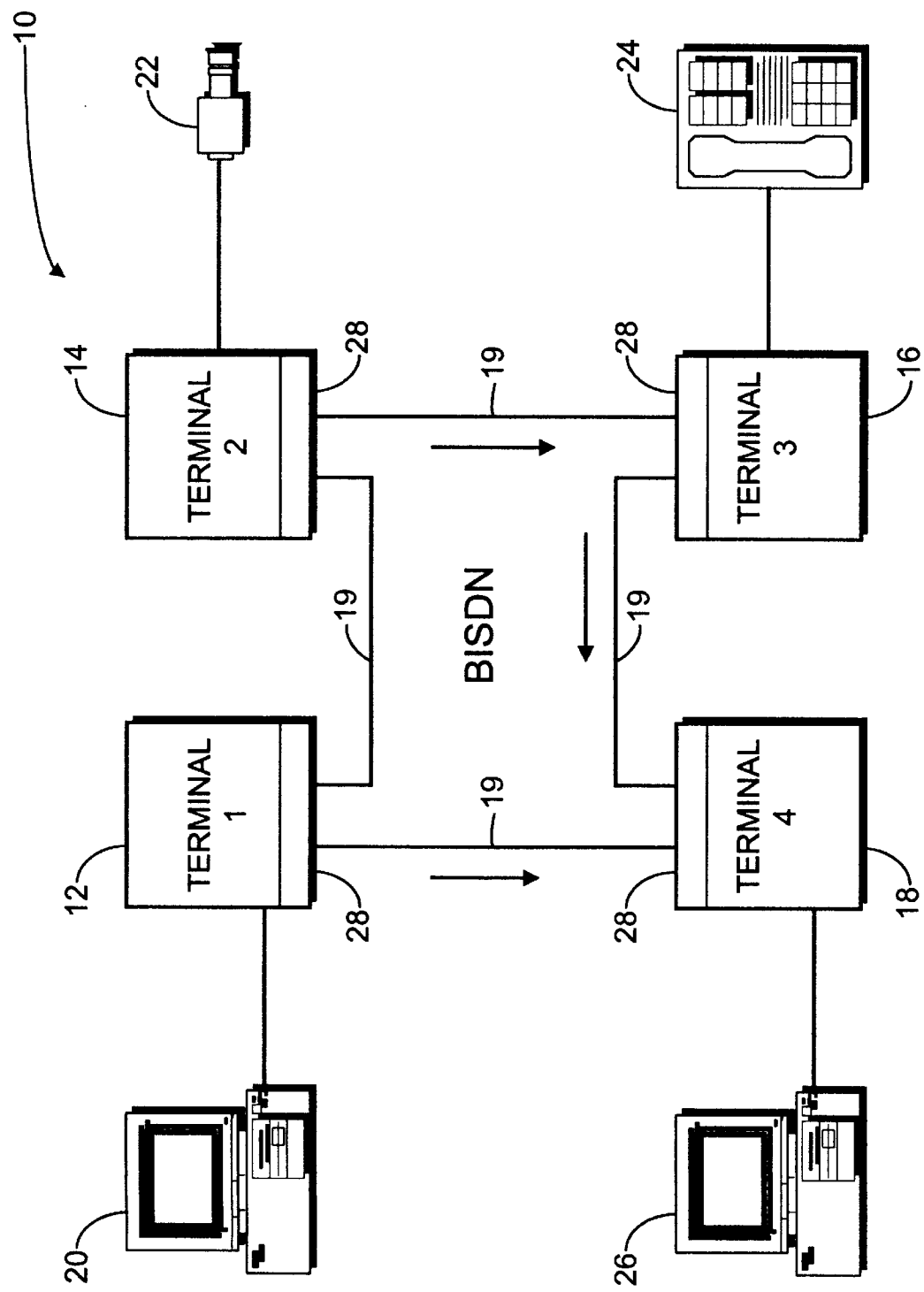
FIG. 1 is a schematic representation of an apparatus according to a first embodiment of the invention shown connected to a network supporting Asynchronous Transfer Mode communications.

Referring to FIG. 1, a network supporting Asynchronous Transfer Mode (ATM) communications is shown generally at 10. The network includes first, second, third and fourth network nodes 12, 14, 16 and 18 which are operable to transmit and receive data to and from each other via optical fibre interconnections 19. The first node 12 is connected to a first computer 20, the second node 14 is connected to a video camera 22, the third node 16 is connected to a telephone 24 and the fourth node 18 is connected to a second computer 26. It will be assumed that the first, second and third nodes 12, 14 and 16 are transmitting data to the fourth node 18. Because network transmissions are multiplexed, each node may transmit on a plurality of "virtual channels". For simplicity, in this embodiment, the first node 12 transmits on virtual channel 0, the second node 14 transmits on virtual channel 1 and the third node transmits on virtual channel 2. Each node has a respective interface circuit 28 for connecting the node to the optical fibre interconnections 19.

Figure 2:
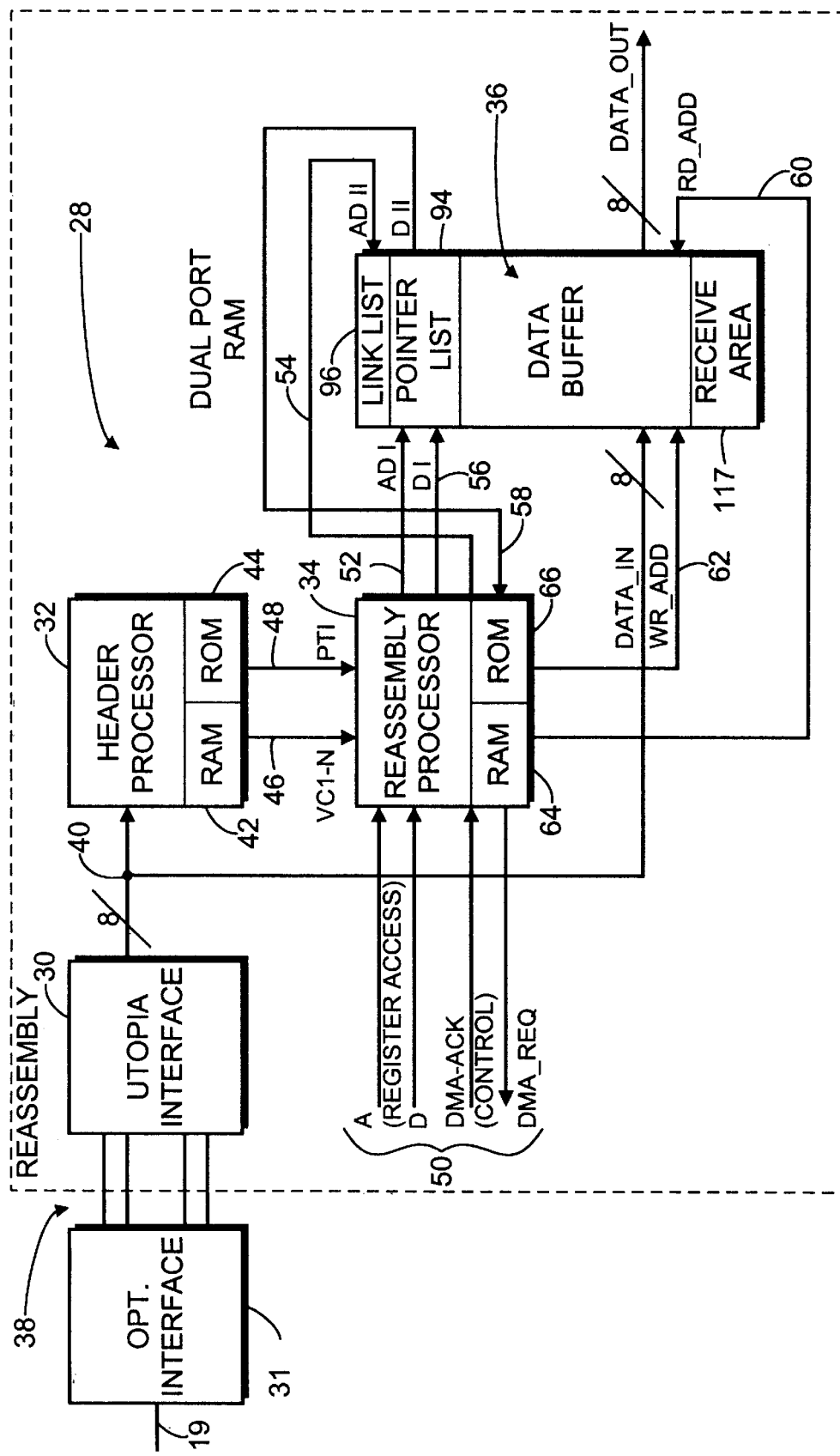
FIG. 2 is a block diagram of a node interface circuit according to the first embodiment of the invention.

Referring to FIG. 2, the interface circuit 28 in each node includes a Universal Test and Operations Physical Layer Interface for ATM (UTOPIA) interface 30, a header processor 32, a reassembly processor 34 and a data memory 36. The UTOPIA interface 30 has physical layer connections including signal lines 38 operable to drive an optical interface 31 connected to the optical fibre interconnections 19, and has conventional logic level signal lines including data lines 40 for communication with the header processor 32 and the data memory 36.

The header processor 32 has associated Random Access Memory (RAM) 42 and Read Only Memory (ROM) 44 for storing a header program operable to control the header processor in accordance with a header algorithm to produce virtual channel signals on virtual channel signal lines 46 and to produce a Payload Type Indicator (PTI) signal on a PTI signal line 48, in response to receiving a header portion of a data packet.

The virtual channel signal lines 46 and PTI signal line 48 are connected to the reassembly processor 34. The reassembly processor 34 further produces and receives computer interface signals on signal lines shown generally at 50, to enable the reassembly processor 34 to communicate with a host computer (not shown). The reassembly processor 34 further communicates with the data memory 36 by address signal lines 52 and 54 and data signal lines 56 and 58. It further produces read and write signals on signal lines of the same names 60 and 62 respectively, for controlling read and write operations of the data memory 36. The reassembly processor further includes its own associated RAM 64 and ROM 66 for storing a reassembly program operable to control the reassembly processor 34 in accordance with a reassembly algorithm to receive signals on the virtual channel signal lines 46 and the PTI signal line 48 and to control the flow of data from the UTOPIA interface to the data memory 36 in such a manner that messages from transmitting nodes can be received.

Figure 3:
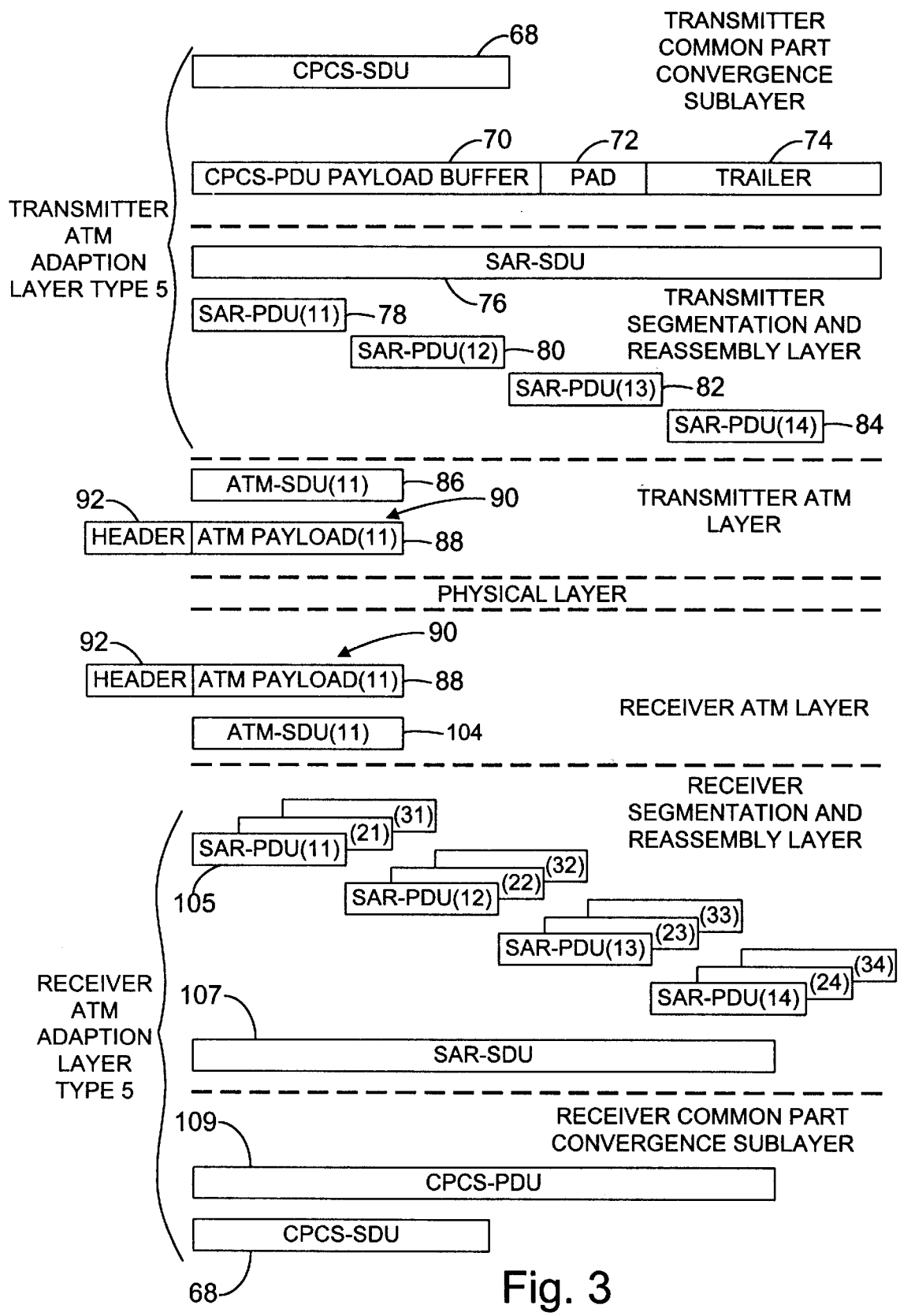
FIG. 3 is a schematic representation of a message represented by ATM cells, according to a B-ISDN ATM Adaptation Layer (AAL) type 5 specification, (prior art)

Referring to FIG. 3, each of the network nodes represents messages according to the International Telecommunication Union B-ISDN ATM Adaptation Layer (AAL) type 5 specification, I.363.5 (05/96), incorporated herein by reference. According to this specification a message may consist of any number of octets (bytes). A message to be transmitted is referred to as a Common Part Convergence Sublayer-Service Data Unit (CPCS-SDU) 68.

To facilitate a common transmission protocol, the Common Part Convergence Sublayer-Service Data Unit is broken down into a Common Part Convergence Sublayer-Protocol Data Unit (CPCS-PDU) 70 having length of up to 64K octets. To this CPCS-PDU 70 is appended a pad portion 72 operable to hold between 0 and 47 octets to provide for a 48 octet alignment of the CPCS-PDU 70, and a trailer portion 74 comprised of 8 octets. The trailer portion 74 includes such information as CPCS user to user indication, common part indicator, the length of the CPCS-SDU and cyclic redundancy check (CRC) information.

The octets comprising the CPCS-PDU 70, the pad portion 72 and the trailer portion 74 together form a Segmentation and Reassembly-Service Data Unit (SAR-SDU) 76. This SAR-SDU is then segmented into integral multiples of 48 octets, referred to as Segmentation and Reassembly-Protocol Data Units (SAR-PDU) 78, 80, 82, 84, etc. Each SAR-PDU is successively treated as an Asynchronous Transfer Mode-Service Data Unit (ATM-SDU) 86 which acts as an ATM payload portion 88 in a data packet 90. The data packet further includes a header portion 92 comprised of 5 octets representing information regarding the virtual path, virtual circuit, payload type, cell loss priority and header error check associated with the ATM payload portion 88. Messages are thus defined by a plurality of 53-octet data packets having respective header and payload portions of 5 and 48 octets respectively.

The virtual path and virtual circuit information found in the header portion 92 relates to the channel associated with the payload portion and the payload type information relates to the type of payload and more specifically to whether or not the payload is the last or final SAR-PDU 84 of the SAR-SDU 76. Each header portion 92 therefore includes a channel representation regarding a channel associated with the data packet and an end-of-message representation representing whether or not the data packet is a final data packet in the message and each payload portion 88 includes information which is part of the message.

The channel representation is represented by a number of bits which is determined by the log in base 2 of the number of messages each network node is required to handle at one time. For example if each node is required to handle 64 different messages, 6 bits will be used for the channel representation. Hence, 6 signal lines will be used as the virtual channel signal lines (46 in FIG. 2).

The end-of-message status indicator is a bit in the header portion 92 which is set active in the header associated with the last ATM payload of the message and which is set inactive for all other ATM payloads of the message.

The data packet 90 is transmitted over the network as a serial bit stream with the most significant bit of the first octet in the header being transmitted first.

Referring back to FIG. 2, the reassembly algorithm run by the reassembly processor 34 is stored in the ROM 66 and includes instructions for defining and maintaining a pointer list 94 of address pointers to unused blocks of data memory 36 operable to store the payload portions of data packets received at the UTOPIA interface 30. In this embodiment, the data memory 36 is capable of storing 1 Meg of address pointers. Therefore, each address pointer is represented by 20 bits and the pointer list must be capable of storing 20-bit words, either in segmented format or whole format. In this embodiment, the address pointers are stored as whole 20-bit words.

Upon initialization of the reassembly processor 34, the reassembly algorithm defines a starting address of unused data memory 36 and calculates successive pointer addresses every 48 octets to an ending address. With 1 Meg of address pointers, approximately 20.8K 48 byte packets can be stored, which is sufficient to adequately support up to 32 virtual channels each supporting 64K byte messages. Each successive calculated address pointer is stored as a separate entry in the pointer list 94. Hence, the pointer list is maintained to identify blocks of unused data memory 36 of equal length and in this embodiment the blocks have a length of 48 octets.

The header algorithm run by the header processor 32 detects the receipt of a data packet (90 in FIG. 3) from the UTOPIA interface 30 and produces signals on the signal lines 46, indicative of the virtual channel associated with the data packet. It further produces a signal on signal line 48 indicative of whether or not the data packet received is the final data packet of the SAR-SDU (76 in FIG. 3). Signal lines 46 thus represent channel information while signal line 48 represents end-of-message information, each of which is communicated to the reassembly processor 34.

Effectively, the reassembly algorithm directs the reassembly processor 34 to retrieve from the pointer list 94 a address pointer defining the beginning of a 48 octet block of memory locations in the data memory 36 in which to store the 48 octets of the received data packet (90 in FIG. 3) appearing at the UTOPIA interface 30. At the same time the reassembly algorithm defines and maintains a link list 96 of pointer addresses associated with each channel. Thus, there is associated with the channel identified by the channel signal lines 46 a link list 96 of pointers to the blocks of memory locations in the data memory 36 in which successively received data packets are stored. It will be appreciated that the pointers stored in the link list may not refer to contiguous blocks of memory as other data packets from other channels may be received between packets of a given message.

Operation

Referring to FIG. 2, the data packet (90 in FIG. 3) is received in a serial optical format from the optical fibre interconnection 19. The optical interface 31 converts the optical signals into serial logic level signals on signal lines 38 which are connected to the UTOPIA interface 30.

The UTOPIA interface 30 converts the serial logic level signals into a parallel format and each octet of the data packet appears successively on data lines 40, with the most significant octet of the header portion (92 in FIG. 3) appearing first.

As successive octets of the header portion are received, the header algorithm directs the header processor 32 to decode the channel representation and activate signal lines 46 to represent the channel from which the data packet originated.

Assume the data packet just being received is from virtual channel 0. The data packet will have channel 0 encoded as virtual circuit information in its header portion upon receiving the data packet, a representation of channel 0 will therefore be placed on the signal lines 46 by the header processor 32 under the control of the header algorithm. In addition, assume that the data packet just being received is the first data packet of four data packets used to represent the message. Since the first data packet is not the last data packet in the message, the PTI signal 48 will not be rendered active. Hence, the header portion of the data packet is received at the header processor 32 and the header processor provides status signals to the reassembly processor 34 indicative of the channel representation and the end-of-message representation.

Figure 4:
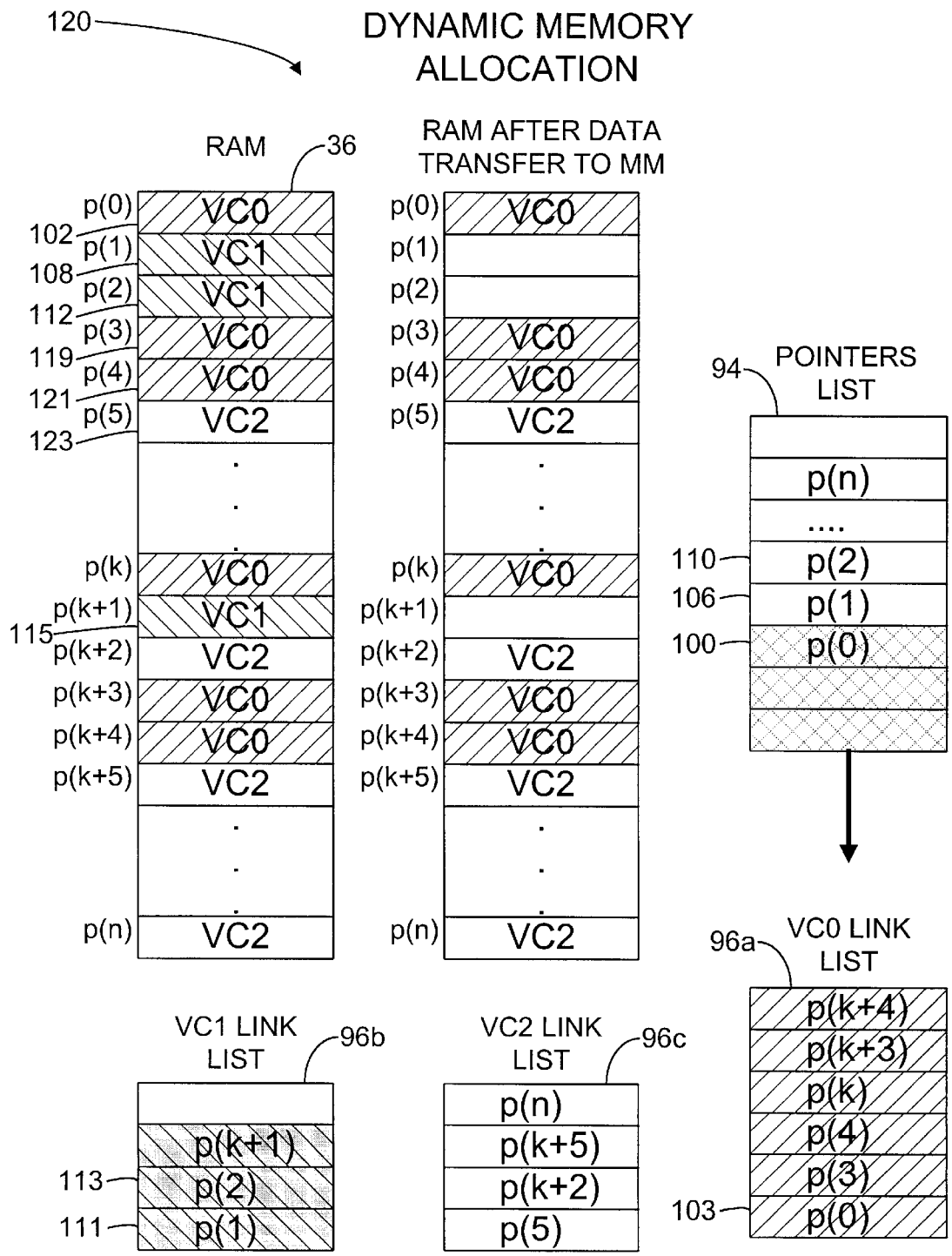
FIG. 4 is a schematic representation of memory partitioning of a data memory according to the first embodiment of the invention.

Referring to FIGS. 2 and 4, upon receiving the channel signals 46 and the inactive PTI signal 48, the reassembly algorithm directs the reassembly processor 34 to retrieve from a next address pointer 100 of the pointer list 94 a pointer p0 which identifies a first 48-octet block 102 of data memory 36. Successive octets of the payload portion 88 of the data packet 90 are then loaded into memory locations beginning at address p0 in the data memory 36. In other words, the payload portion (88 in FIG. 3) of a received data packet (90 in FIG. 3) is loaded into a block of data memory identified by a pointer from the pointer list. At the same time, address pointer p0 is removed from the pointer list 94 and is stored at a first location 103 in a link list 96a associated with virtual channel 0. Thus, the pointer is added to the link list associated with the channel representation indicated by the header portion of the data packet.

Referring back to FIG. 3, the received payload portion 88 is an Asynchronous Transfer Mode-Service Data Unit (ATM-SDU) 104, according to the International Telecommunication Union B-ISDN ATM Adaptation Layer (AAL) type 5 specification, I.363.5 (05/96). As successive data packets for a given message are received, they act as successive Segmentation And Reassembly-Protocol Data Unites (SAR-PDU) 105. It is the job of the reassembly processor (34 in FIG. 2) to reassemble these SAR-PDU's 105 into a contiguous form referred to as a Segmentation And Reassembly-Service Data Unit (SAR-SDU) 107 while data packets from other channels are being received. In accordance with the specification referred to herein, the SAR-SDU 107 is further referred to as a Common Part Convergence Sublayer-Protocol Data Unit (CPCS-PDU) 109 which is identical to the original CPCS-PDU comprised of the CPCS-PDU payload portion 70, the pad portion 72 and the trailer portion 74. The pad portion 72 and the trailer portion 74 are then stripped off, leaving the original CPCS-SDU 68 or message.

After the first data packet is received, a second data packet may be received however, there is no assurance that the next received data packet will be from the same channel. For example, the next data packet may be received from virtual channel one. In this case, the data packet is received as described above, with the exception that, referring back to FIG. 2, the header algorithm directs the header processor to cause signal lines 46 to indicate that virtual channel one is the source of the data packet. As before, assume that this first data packet from virtual channel one is one of many data packets forming the message from channel one and therefore the PTI signal is not rendered active.

The reassembly algorithm causes the header processor 32 to receive the virtual channel signals on signal lines 46 and the inactive PTI signal on signal line 48 and seeks the next pointer pl from the next address pointer 106. Successive octets of the payload portion of this second-received data packet are then stored at a 48 -octet block of successive memory locations 108 beginning at address p1 in data memory 36. At the same time pointer p1 is stored at a first location 111 in a link list 96b associated with virtual channel one.

After the above two data packets are received, a third data packet may be received from any virtual channel, however, assume that the next data packet received is a second data packet from virtual channel one. In this case, the data packet is received as described above, including the representation indicating virtual channel one as the source on signal lines 46. As before assume that this second data packet from virtual channel one is one of many data packets forming the message from this channel and therefore the PTI signal is not rendered active. Again, the reassembly algorithm causes the header processor 32 to receive the virtual channel signals 46 and the inactive PTI signal 48 causing the reassembly processor to seek the next pointer p2 from the next address pointer 110. Successive octets of the payload portion of this third-received data packet are then stored at a 48-octet block of successive memory locations 112 beginning at address p2 in data memory 36. At the same time pointer p2 is stored at a second location 113 the link list 96b associated with virtual channel one.

If the next two received data packets are from virtual channel 0 the next two locations in link list 96a associated with virtual channel 0 receive the next pointers p3 and p4 and the successive octets of the payload portions of these data packets are stored in blocks of memory 119 and 121 beginning at addresses p3 and p4 respectively in the data memory 36.

Similarly, if now the next received data packet is from virtual channel 2, the first location in link list 96c associated with virtual channel 2 receives the next pointer p5 and the successive octets of the payload portion are stored in a block of memory 123 beginning at address p5 in the data memory.

In the above manner, various data packets are received and their respective payload portions are stored at various memory locations as indicated generally at 120 in FIG. 4. In addition, each link list 96a, 96b, 96c has a respective set of pointers which point to the starting addresses of respective 48-octet blocks of memory in the data memory 36 containing the payload portions of each data packet representing respective messages received on each respective virtual channel.

When an end of message signal appears on signal line 48, for, say, the message received on virtual channel one, the reassembly processor 34 retrieves the pointers p1, p2, pk+1 stored in the link list 96b associated with virtual channel one, in the order they were stored. As each pointer is retrieved it is used to address the data memory 36 to indicate the beginning of its respective block of data memory 36 used to store a respective payload portion of the original message. The reassembly algorithm directs the reassembly processor 34 to retrieve respective payload portions of the message from respective blocks of data memory 108, 112 and 115 and copy them to a separate receive area 117 of the data memory 36, shown in FIG. 2. In this manner all payload portions comprising the original message are retrieved in the order in which they were received at the node and are copied and stored in a contiguous manner in the receive area as the CPCS-PDU (109 in FIG. 3). Thus, each of the payload portions of each of the received data packets associated with the same message is copied into a receive area of the data memory.

After each respective payload portion is copied to the receive area, its associated pointer p1, p2, pk+1 is removed from the associated link list 96b and moved back to the pointer list 94. In effect therefore, the pointer associated with each block of data memory used to store a respective payload portion is removed from the link list and the pointer is added to the pointer list, in response to the end-of-message representation.

Generally, all payload portions of a given message are copied to the receive area in the order in which they were received such that the receive area contains a replica of at least a contiguous portion of the message.

The message is then made available to a host computer or other device as a CPCS-SDU in accordance with the AAL type 5 specification.

While specific embodiments of the invention have been described and illustrated, such embodiments should be considered illustrative of the invention only and not as limiting the invention as construed in accordance with the accompanying claims.

What is claimed is:

1. A method for receiving messages defined by data packets having respective header and payload portions, each header portion including a channel representation regarding a channel associated with said data packet and an end of message representation representing whether or not the data packet is a final data packet in a message and each payload portion including information pertaining to the message, the method including the steps of:

i) maintaining a pointer list of defined address pointers to unallocated blocks of data memory operable to store the payload portions of said data packets;

ii) maintaining a link list of address pointers associated with each channel;

iii) loading the payload portion of a received data packet into a block of data memory identified by an address pointer from said pointer list;

iv) removing said address pointer from said pointer list; and v) adding said address pointer to said link list associated with the channel representation indicated by the header portion of said data packet.

2. A method as claimed in claim 1 further including the step of executing the steps of claim 1 with a reassembly processor.

3. A method as claimed in claim 1 further including the step of receiving at a header processor the header portion of the data packet and causing said header processor to provide status signals indicative of said channel representation and said end of message representation.

4. A method as claimed in claim 1 further including the step of maintaining said pointer list to identify blocks of equal length.

5. A method as claimed in claim 4 further including the step of maintaining said pointer list such that said blocks of unused data memory include 48 octets each.

6. A method as claimed in claim 1 further including the step of copying the payload portions of each of said received data packets associated with the same message into a receive area of data memory.

7. A method as claimed in claim 6 further including the step of removing from said link list the address pointer associated with each block of data memory used to store a respective payload portion.

8. A method as claimed in claim 7 further including the step of adding said address pointer to said pointer list, in response to said end of message representation.

9. A method as claimed in claim 8 further including the step of copying said payload portions to said receive area in the order in which they were received such that said receive area contains a replica of at least a contiguous portion of said message.

10. A method as claimed in claim 8 further including the step of copying each address pointer to said pointer list after its respective payload portion is copied to said receive area.

11. An apparatus for receiving messages defined by data packets having respective header and payload portions, each header portion including a channel representation regarding a channel associated with said data packet and an end of message representation representing whether or not the data packet is a final data packet in a message and each payload portion including information pertaining to the message, the apparatus comprising:

a) data memory for storing the payload portions of said data packets;

b) list memory for storing:
  i) a pointer list of defined address pointers to unallocated blocks of data memrory; and
  ii) a link list of address pointers associated with each channel;

c) a header processor for receiving the header portion of the data packet and for providing status signals indicative of said channel representation and said end of message representation;

d) a reassembly processor programmed to maintain said pointer list and said link list in said list memory, said reassembly processor being further programmed to load the payload portion of a received data packet into a block of data memory identified by an address pointer from said pointer list, to remove said address pointer from said pointer list, and to add said address pointer to said link list associated with the channel representation indicated by said status signals from said head processor.

12. An apparatus as claimed in claim 11 wherein said blocks are of equal length.

13. An apparatus as claimed in claim 12 wherein said blocks of unused data memory include 48 octets each.

14. An apparatus as claimed in claim 11 wherein said data memory has a receive area and wherein the reassembly processor is further programmed to:

a) copy the payload portions of each of said received data packets associated with the same message into the receive area of data memory;

b) remove from said link list the address pointer associated with each block of data memory used to store a respective payload portion; and c) add said address pointer to said pointer list, in response to said status signals indicative of said end of message representation.

15. An apparatus as claimed in claim 14 wherein the reassembly processor is further programmed to copy said payload portions to said receive area in the order in which they were received such that said receive area contains a replica of at least a contiguous portion of said message.

16. An apparatus as claimed in claim 14 wherein the reassembly processor is further programmed to copy each address pointer to said pointer list after its respective payload portion is copied to said receive area.

* * * * *